United States Patent Office 3,641,009
Patented Feb. 8, 1972

3,641,009
CARDIO-ACTIVE OXIDO-BUFADIENOLIDES
Kurt Radscheit, Kelkheim, Taunus, Ulrich Stache and
Werner Haede, Hofheim, Taunus, Werner Fritsch,
Neuenhain, Taunus, and Ernst Lindner, Frankfurt am
Main, Germany, assignors to Farbwerke Hoechst Aktiengesellschaft vormals Meister Lucius & Bruning,
Frankfurt am Main, Germany
No Drawing. Filed Dec. 2, 1969, Ser. No. 881,582
Claims priority, application Germany, Dec. 5, 1968,
P 18 12 943.6
Int. Cl. C07c *173/04*
U.S. Cl. 260—239.57
2 Claims

ABSTRACT OF THE DISCLOSURE

Cardio-active oxido-bufadienolides of the formula

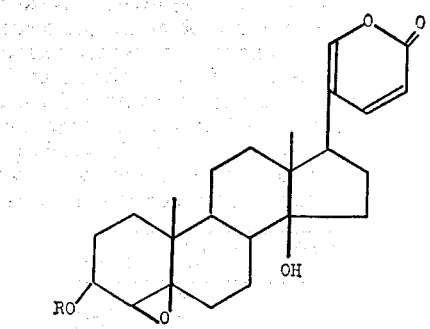

wherein R is hydrogen or lower acyl, and a method for making them.

The present invention relates to oxido-bufadienolides of the general formula

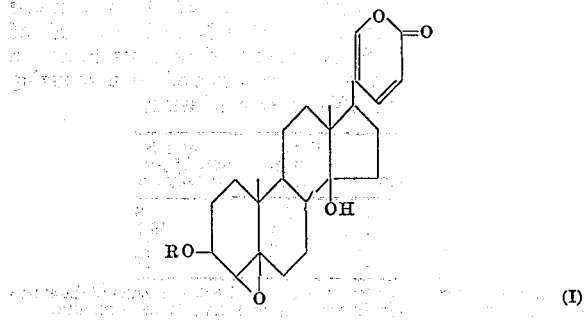

in which R represents hydrogen or lower acyl.

The present invention also relates to a process for the manufacture of the above-specified compounds of the Formula I, wherein scillarenine is treated with a per-acid and, if desired to obtain corresponding esters (R=acyl), the resulting product is esterified with a lower aliphatic carboxylic acid, preferably acetic acid.

The process according to the present invention proceeds according to the following scheme:

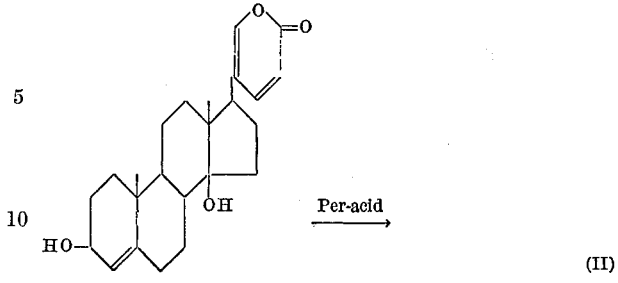

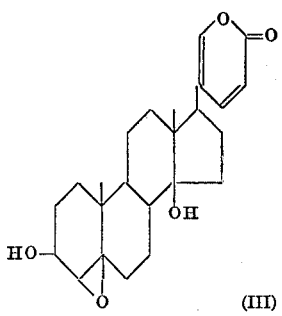

The reaction is carried out in an inert solvent at room temperature. As per-acid, monoperphthalic acid, perbenzoic acid or mono-chloro-perbenzoic acid is preferably used. The reaction is completed after some hours.

For preparing the oxido-bufadienolides acylated in 3-position, the 3-hydroxy compounds are esterified in the usual manner with lower aliphatic carboxylic acids. For this purpose, there are especially suitable acetic acid and halogenated acetic acids such as chloro-, bromo- or iodoacetic acid. Propionic acid, too, may be used for the esterification. The acylation is advantageously effected by treatment with the corresponding carboxylic acid anhydride in the presence of pyridine at room temperature.

The products of the present invention are novel and they are distinguished by a strongly marked cardio-activity. They are therefore suitable for the medicinal treatment of heart damages, especially in the case of cardiac insufficiency or tachycardia. They are preferably administered orally in the form of tablets or dragées which contain, in addition to the active substances, the usual adjuvants and excipients, for example lactose, starch, tragacanth, etc.

The products of the invention may also be used as intermediates in the manufacture of drugs, for example, by conversion of the 3-hydroxy compounds into corresponding substituted 3-hydroxy derivatives such as ethers or esters known in steroid chemistry.

The following example illustrates the invention.

EXAMPLE 4,5β-oxido-3β,14β-dihydroxy-bufa-20(21),22(23)-dienolide (=4,5β-oxido-scillarenine A)

58 mg. of m-chloro-perbenzoic acid were added to a solution of 80 mg. of scillarenine in 6.7 ml. of absolute methylene chloride and the whole was allowed to stand for 7 hours at room temperature. The reaction mixture was then poured into an excess of aqueous sodium bicarbonate solution and extracted several times with methylene chloride. The combined extracts were washed successively with sodium bicarbonate solution and water. After removal of the solvents by distilaltion, a solid residue remained behind which was dissolved in a large amount of hot methanol. The residue was removed by decanting and the solution was evaporated, taken up in a mixture of tetrahydrofurane and methanol and chromatographed on basic aluminum oxide of the activity degree II. Elution was effected consecutively with benzene, methylene chloride/methyl acetate mixtures and finally with ethyl acetate containings 5% of methanol. From the last eluate, there were obtained 40 mg. of the white crystalline epoxide which, after recrystallization from absolute ethanol, was found to melt at 236–238° C. (Tottoli) Characteristic infrared bands: 3460, 3060, 1740 (shoulder), 1710, (measured in KBr) 1625–1630, 1530–1540, 1240 cm.$^{-1}$. Ultraviolet spectrum: $\lambda_{max.}$=297–298 m$\mu$, $\epsilon$=6650.

We claim:
1. An oxido-bufadienolide of the formula

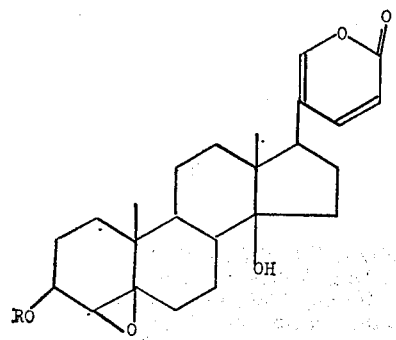

wherein R represents hydrogen or acyl derived from a lower aliphatic carboxylic acid.

2. 4,5β - oxido-3β,14β-dihydroxy-bufa-20(21),22(23)-dienolide.

References Cited

Dferassi "Steroid Reactions" p. 598 (1963).

HENRY A. FRENCH, Primary Examiner

U.S. Cl. X.R.

260—999